(12) United States Patent
Opaterny

(10) Patent No.: US 8,635,435 B2
(45) Date of Patent: Jan. 21, 2014

(54) METHOD FOR MONITORING A CYCLIC USER PROGRAM

(75) Inventor: Thilo Opaterny, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1672 days.

(21) Appl. No.: 11/820,242

(22) Filed: Jun. 19, 2007

(65) Prior Publication Data

US 2008/0016388 A1      Jan. 17, 2008

(30) Foreign Application Priority Data

Jun. 20, 2006   (EP) ...................................... 06012658

(51) Int. Cl.
 *G06F 9/00*      (2006.01)
(52) U.S. Cl.
 USPC ......................................................... 712/227
(58) Field of Classification Search
 None
 See application file for complete search history.

(56) References Cited

U.S. PATENT DOCUMENTS

| | | | |
|---|---|---|---|
| 5,889,999 A * | 3/1999 | Breternitz et al. ............ | 717/158 |
| 6,094,729 A | 7/2000 | Mann | |
| 6,988,190 B1 * | 1/2006 | Park .............................. | 712/241 |
| 7,174,543 B2 * | 2/2007 | Schwemmlein et al. ..... | 717/128 |
| 2004/0083088 A1 * | 4/2004 | Berent et al. .................... | 703/19 |
| 2005/0060690 A1 | 3/2005 | Tung et al. | |

FOREIGN PATENT DOCUMENTS

| | | |
|---|---|---|
| DE | 101 07 134 A1 | 8/2002 |
| EP | 1 119 801 B1 | 8/2001 |
| WO | WO 2004/015564 A2 | 2/2004 |

* cited by examiner

*Primary Examiner* — Jacob A Petranek

(57) ABSTRACT

There is described a method for monitoring a cyclic user program which is executed on an automation device by means of a programming device connected to communicate with the automation device, with a monitoring task being sent from the programming device to the automation device and the monitoring task containing command numbers of the commands to be monitored as well as the associated variables. With the method rarely run branches of the user program can also be easily observed by an execution of a command, by the data associated with the variables with corresponding command number and a first counter value, which assigns the data directly or indirectly to a cycle of the user program, being stored by the automation device in a recording buffer, by the old recording of the associated data including the first counter value being overwritten on renewed execution of the command and by the recording buffer being able to be output at the request of the programming device by the automation device.

15 Claims, 3 Drawing Sheets

```
if temperature > maximum
then heating := 0
else heating := (maximum - temperature) * 10
end
```

FIG 1 if temperature > maximum
then heating := 0
else heating := (maximum - temperature) * 10
end

FIG 2

| 101 | L LW10 |
| --- | --- |
| 102 | GT LW12 |
| 103 | JNC 107 |
| 104 | L 0 |
| 105 | T LW14 |
| 106 | JMP 111 |
| 107 | L LW12 |
| 108 | SUB LW10 |
| 109 | MUL 10 |
| 110 | T LW14 |
| 111 | BE |

FIG 3

| 101 | AC |
| --- | --- |
| 102 | LW12, AC |
| 105 | LW14 |
| 107 | AC |
| 108 | LW10, AC |
| 109 | AC |
| 110 | LW14 |

FIG 4

| 1 | 6 | 4 | 5 | 5 |
|---|---|---|---|---|
| 101 | 321 | 55 | | |
| 102 | 321 | 75 | false | |
| 105 | 120 | 0 | | |
| 107 | 321 | 75 | | |
| 108 | 321 | 55 | 20 | |
| 109 | 321 | 200 | | |
| 110 | 321 | 200 | | |

FIG 5

| 4 | 8 | 7 |
|---|---|---|
| 321 | 2005-08-31 13:44:14 | 765 |
| 120 | 2005-08-31 13:44:10 | 123 |

FIG 6

| 1 | 9 | 4 | 5 | 5 |
|---|---|---|---|---|
| 101 | 120 | 97 | | |
| 102 | 120 | 75 | true | |
| 105 | 120 | 0 | | |
| 107 | 111 | 75 | | |
| 108 | 111 | 55 | 20 | |
| 109 | 111 | 200 | | |
| 110 | 111 | 200 | | |

METHOD FOR MONITORING A CYCLIC USER PROGRAM

CROSS REFERENCE TO RELATED APPLICATIONS

This application claims priority of European application No. 06012658.8 EP filed Jun. 20, 2006, which is incorporated by reference herein in its entirety.

FIELD OF INVENTION

The invention relates to a method for monitoring a cyclic user program which is executed on an automation device by means of a programming device connected to communicate with the automation device, with a monitoring task being sent from the programming device to the automation device and the monitoring task containing command numbers of the commands to be monitored as well as associated variables.

BACKGROUND OF THE INVENTION

Such a method is used in the field of automation technology. An automation system is used to solve a control problem or assumes the control of a process. It reads the values of sensors and operating elements and processes these with internal states into output values for actuators. A modern automation system consists to a significant extent of software, in order to allow it to be adapted by users to suit their particular tasks.

The programming of an automation system differs from the programming of other areas. The program which executes month-end processing in a bookkeeping system for example has a clear beginning and a clear end with a short run time. Care must be taken in this case that it can only be activated once a month. If an automation system controls an elevator for example, then the program remains in operation for as long as the elevator is in operation. The length of the two programs may be approximately the same, but the run time and the general conditions differ greatly however. The program is constantly repeated by the firmware of the automation system. In automation systems the programming is referred to as cyclic programming. The run time must be short, since this approximately corresponds to the reaction time of the controller.

The automation system is not normally programmed at the automation system itself, since it has no screen and no keyboard—except where it needs these for handling the control task. Normally a programming device is used, generally consisting of a commercially available PC with a connection facility to the automation system and the necessary software. After the program has been created it is transmitted to the automation system and executed there. The user programs the solution of his control task in programming languages, such as those described in IEC 1131-3.

When an automation system is commissioned situations are encountered in which there is a desire to observe the program. In such cases this observation is to take place during operation with minimal intervention into the running program, i.e. not in the way that such requirements are dealt with on a PC. Tasks are transmitted to the automation system over the connection between programming device and automation system, executed there and the result is transmitted back to the programming device.

A protocol is described in EP 1 119 801 B1 which makes it possible to monitor the execution of the machine commands of the automation system. The software running on the programming device for observation, known as the debugger for short, assigns the observed values at the machine commands back to the language constructs. This requires that the machine commands necessary for the observation of the program are known for the language construct on the programming device.

A method is described in WO 2004/015564 A2 in which debugging can be implemented even if the concrete implementation of the machine commands is not known by a standard controller. The disadvantage of the methods described is the tendency for nothing to be recorded with commands which are only run sporadically. The primary reason for this is that the programming devices use operating systems with windows and multitasking, as will be illustrated using a Windows PC as an example.

The communication facilities of a Windows PC are on one hand very diverse, on the other hand its reaction behavior leaves much to be desired. Windows programs must make do with one event queue per window. All events for this window are arranged in this one queue. The events from this queue are processed on after the other in sequence. Regardless of the communication path used, in the final analysis everything is synchronized via this event queue. The detrimental result of this is that the number of events per second for an additional task such as the debugging may not be greater than the frequency with which keyboard and mouse are polled. If these limits are slightly exceeded, the Windows PC reacts sluggishly; the mouse cursor starts to jump around. If these limits are greatly exceeded, the computer only reacts very sporadically to user entries. This must be avoided. The most important ancillary task of all driver programmers is for the necessary data to be filtered through the system, but for the number of the events to remain low for synchronization with the window system. This problem thus relates to all systems with windows and multitasking and is not just to be encountered in Windows.

For the debugging of automation systems this state of affairs thus presents itself as follows: A program runs on the automation system. A specific sequence of commands is to be monitored. For this sequence of commands a monitoring job is transmitted from the programming device to the automation device. When the commands concerned are run, the requested data is recorded once. The monitoring job is then blocked. The recorded data is transmitted to the programming device. The received data is filtered through the various driver layers. At some time or other they are then processed up to the point at which they can be output. To this end an event must be sent to a window. This in its turn is distributed to a method which in the final analysis edits the data so that the window can be redrawn. The programming device thus displays the data, the user can see it. So that the system remains operable, at least one keyboard request is now awaited before a release is sent by the programming to the automation device for the monitoring task. If the commands concerned are run thereafter, the sequence begins again.

The flow control described here now has the desired result that the programming device remains operable. If a command sequence is executed more often on the automation system than is the reaction time of the flow control, then not every execution can be observed. This does not actually present any problem. The keyboard polling typically occurs 60 times per second. In the ideal case 60—typically a third thereof, i.e. 20—data packets per second are displayed. At this speed a person can read everything.

The problem arises with sporadically executed commands. Example: An IF-THEN-ELSE has been programmed in ST (Structured Text, one of the IEC 1131 languages). The condition will however only be fulfilled on every hundredth execution, i.e. the THEN branch is only performed for every hundredth execution, whereas the condition is executed each time. Let us further assume that the IF-THEN-ELSE is executed 1000 times per second. With 20 recordings per second 980 executions are lost. In this time there were only 10 opportunities to also observe the THEN branch. Thus the THEN has only been recorded 0.2 times on average. Which means in practice that the THEN branch is only seen after several seconds, or not at all.

In practice however it is often the rarely executed branches of a program which present problems, since they deal with any exceptions. But it is precisely these branches that are very hard to observe.

SUMMARY OF INVENTION

An object of the invention is to specify a method with which the rarely executed branches of a cyclic user program which is executed on an automation device are able to be observed without any problems.

This object is achieved in accord with a method wherein, on execution of a command, for data associated with variables with corresponding command number and a first counter value, which command assigns the data directly or indirectly to a cycle of the user program, data is stored by the automation device in a recording buffer. An old recording of the associated data, including the first counter value, is overwritten on renewed execution of the command and the automation device outputs data in the recording buffer at the request of the programming device.

By storing the data associated with the commands in the recording buffer the data for rarely executed commands is not lost but can be output on request by the programming device, can be displayed by this device and can thus be easily observed by a user. By contrast with the known method, the monitoring task is neither blocked nor does it send data to the programming device unsolicited. If a command is executed a further time, it overwrites its old recording. Thus all commands executed at any time are in the recording buffer. In such cases they can have different first counter values, i.e., if they have been run during different cycles of the user program. The flow control in its turn is implemented by the programming device. The programming device explicitly requests the automation system to output the recording buffer. The recording buffer is not cleared in this case.

For each command executed the recording buffer contains the command number, the first counter value and the values of the associated data. If a command is not executed at all there is no entry for it in the recording buffer.

A counter which is incremented for each cycle or even for only a part of the cycle is suitable for the counter value for example. Another option would be a counter which is incremented for each recording, i.e. if a program section is not run in a cycle, the counter will not be incremented. A true clock time is not needed since it is only whether the data is from the same cycle that is to be detected.

In an advantageous embodiment, for commands to be monitored which have not yet been executed, command number and a second counter value are stored in the recording buffer and storage space is reserved for the associated data, with the second counter value indicating that the relevant command has not yet been executed. This mode of operation generally leads to a somewhat longer recording buffer, but is however easier for further processing.

In a further advantageous embodiment the second counter value is identical to the first counter value. This can be implemented for example by the first counter value counting the cycle number of the user program and storing the cycle number "0" for commands not yet executed.

In a further advantageous embodiment the first counter value is assigned to the relevant cycle of the user program by means of a table. An assignment of relative cycle number to absolute cycle number can be stored in this table for example.

In a further advantageous embodiment the first counter value is assigned to real time by means a table. This naturally also shows which commands have been run in the same cycle of the user program, with the additional information also being provided as to when the corresponding cycle was executed.

In a further advantageous embodiment the data is presented on the basis of the first counter value in the programming device in accordance with its currency. A user can thus easily recognize which data is current and which is no longer valid. The outdated data can for example be edited out in stages— the older the data the paler the color.

In a further advantageous embodiment the monitoring task features a trigger through which an image of the recording buffer is saved in a second buffer. Thus one could formulate a trigger for example so that the recording buffer is saved if a sporadically run command is executed. This also enables the rarely occurring conditions and the values present when they arise to be determined.

BRIEF DESCRIPTION OF THE DRAWINGS

The invention is described and explained in more detail below on the basis of the exemplary embodiments shown in the figures. The figures show:

FIG. 1 a code fragment of commands to be monitored in ST (Structured Text),

FIG. 2 the code fragment from FIG. 1, translated into an AWL (instruction list), FIG. 3 the request to the automation device produced by the AWL from FIG. 2, FIG. 4 the values stored in a recording buffer as a result of the request from FIG. 3, FIG. 5 a table for assignment of the first counter value for real time;

FIG. 6 an image of the recording buffer saved in a second buffer;

DETAILED DESCRIPTION OF INVENTION

Figure 7:
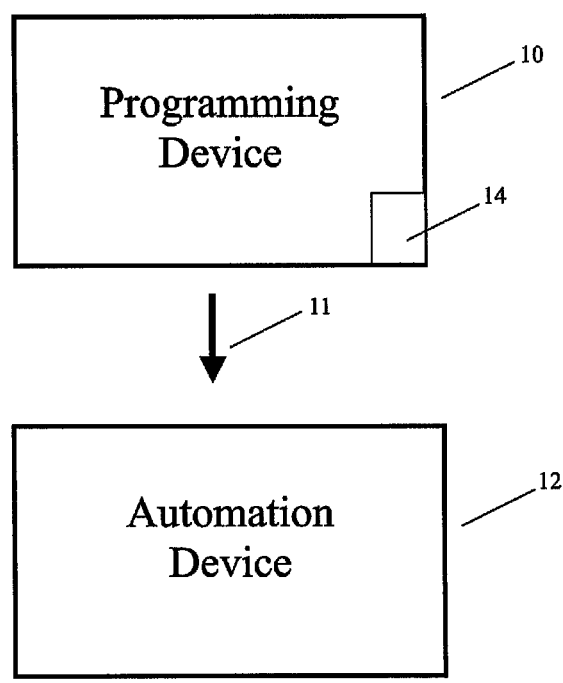
FIG. 7 a programming device and an automation device in an automation system.

FIG. 7 shows a programming device 10 sending a request 12 to an automation device 14. FIG. 1 shows a code fragment of commands written in ST (Structured Text) of which the execution is to be monitored in the automation device. The example shows a simple IF-THEN-ELSE loop of a program for controlling heating, with the heating being switched off if the current temperature value exceeds a parametrizable maximum value, or else being regulated to a value to be determined as a function of the maximum value.

FIG. 2 shows the code fragment of FIG. 1, translated into an instruction list (AWL) for an automation device. This consists of a series of commands 2 which are consecutively numbered in their order of processing, and the resulting command numbers 1. The commands 2 will now be briefly explained for understanding of the following Figures: Command 101 loads the value of the variable LW10, which specifies the current temperature, into the accumulator (Akku1). Command 102 compares the value in Akku1 with the value of the variable LW12, the parameterizable maximum value. Command 103 is a conditional branch command, commands 104 and 105 form the THEN branch shown in FIG. 1: 104 loads the value "0" into Akku1 and 105 assigns to the value stored in Akku1 the variable LW14, i.e. the "heating" of FIG. 1. The ELSE branch depicted in FIG. 1 begins with command 107: Load the maximum value LW12 into Akku1 (107), subtract the current temperature (108), multiply by "10" (109) and assign the result to the variable "heating", LW14 (110). To now observe the behavior of the automation device it is sufficient to monitor the values of the variables which change. The monitoring task sent to the automation device thus contains the command numbers 1 of the commands 2, which access variables 3, as well as the corresponding variables 3 themselves.

FIG. 3 shows the request 11 sent from the programming device 10 to the automation device 12. This request 11 contains the command numbers 1 of the commands 2 which access the variables 3, as well as the corresponding variables 3 themselves. In this case "AC" stands for the current value stored in the accumulator Akku1. The commands 2 not listed here, such as the branch commands for example, do not affect the values of the variables 3. Also, as shown in FIG. 7, with the request 11, data for rarely executed commands, output on request by the programming device, can be displayed by this programming device 12 on a display 14 for observation by a user.

FIG. 4 shows the values stored in the recording buffer 6 on the basis of the request from FIG. 3. These are the relevant command numbers 1 as well as the associated data 5, i.e. the requested values of the variables 3. In addition a first counter 4 is stored for each variable, which in this example directly specifies the cycle number of the user program executed on the automation device. I.e. the commands 101, 102 and 107 to 110 were executed in cycle number 321, whereas command 105 was run for the last time in cycle 120. Command 105 thus represents the said sporadic commands which with the conventional method cannot be observed or can only be observed occasionally at an indeterminate time. The fact that the observed commands 2 are always recorded means that the values 5 of commands 2 which are run extremely rarely are also not lost.

FIG. 5 shows a Table 8, which assigns the first counter value 4 a time stamp 7 in each case. The precise embodiment of the time stamp 7 can remain open in this case, the only important aspect is the ability to restore the sequence. The time stamp 7 in the recording buffer 6 enables a good statement about the validity of the values 5 to be made.

FIG. 6 shows an image of the recording buffer 6 saved in a second buffer 9, the creation of which was initiated by a trigger in the monitoring task. In the example the trigger has been formulated so that the recording buffer 6 is saved if command 105 is run. The saved buffer 9, as well as the values of commands 101 and 102 for cycle number 120, also contains the values of the commands 107 to 110 at earlier points in time. From these values 4, 5 it can be seen for how long or how often the THEN branch was run. Through the particular trigger the rarely occurring conditions and the values 5 related to their occurrence can be determined.

In summary the invention relates to a method for monitoring a cyclic user program which is executed on an automation device, by means of a programming device connected for communication to the automation device, with a monitoring task being sent from the programming device to the automation device and the monitoring task containing command numbers of the commands to be monitored as well as associated data. The object of the invention is to specify a method with which the rarely run branches of the user program can also be easily observed. This object is achieved, when a command is executed, by the associated data with corresponding command number and a first counter value, which directly or indirectly assigns the data to a cycle of the user program, being stored by the automation device in a recording buffer, by the old recording of the associated data including the first counter value being overwritten on renewed execution of the command and by the recording buffer being able to be output at the request of the programming device by the automation device.

The invention claimed is:

1. A method for monitoring commands and acquired data in a cyclic user program, comprising:
   executing commands of the cyclic user program on an automation device;
   providing a programming device connected to the automation device for communication;
   sending a monitoring task from the programming device to the automation device, wherein the monitoring task assigns a command numbers to each of the commands to be monitored and variables associated with each of the commands;
   storing for each monitored command:
      data associated with a variable on execution of the command being monitored,
      a corresponding command number for the command being monitored, and
      a first counter value assigning the data associated with the command being monitored directly or indirectly to a cycle of the cyclic user program, wherein the assigned data are stored by the automation device in a recording buffer;
   overwriting an old recording of the assigned data and the first counter value associated with each executed command being monitored upon a renewed execution of the executed command, said overwriting limited to only overwriting those portions of the old recording which are associated with each renewed execution of an executed command, so that all different commands executed while monitoring the cyclic user program, and stored data associated with the different commands, remain identifiable at the same time in the recording buffer, wherein different first counter values are assigned when data in the buffer corresponds to commands executed during different cycles of the user program; and
   outputting content of the recording buffer by the automation device on request of the programming device and displaying the data to a user.

2. The method as claimed in claim 1, wherein, when a command to be monitored has not yet been executed, an associated command number and a second counter value are stored in the recording buffer, wherein the second counter value identifies the not yet executed command.

3. The method as claimed in claim 2, wherein a storage space for the data associated to the command not yet executed is reserved.

4. The method as claimed in claim 2, wherein the second counter value is identical to the first counter value.

5. The method of claim 1, wherein an assignment of the first counter value assigns data to an respective cycle of the cyclic user program based upon a table.

6. The method of claim 1, wherein an assignment of the first counter value assigns data to a real time based upon a table.

7. The method as claimed in claim 1, wherein the data are displayed in the programming device according to a time order based upon the first counter value.

8. The method as claimed in claim 1, wherein the monitoring task has a trigger to save an image of the recording buffer in a second buffer so that when a run command is executed values and conditions having occurred during monitoring can be determined.

9. A method for monitoring commands and acquired data in a cyclic user program, comprising:
   executing the cyclic user program on an automation device;
   providing a programming device connected to the automation device for communication;
   selecting commands for which execution is to be monitored in the automation device based upon command numbers, wherein variables are associated with the commands;
   storing acquired data, associated with a variable associated with each of the commands being monitored during execution by the automation device, in a recording buffer when the each of the commands being monitored is executed, wherein a command number corresponding to each command being monitored is stored, wherein a counter value assigned to the data is stored, and wherein the counter value is based upon a cycle of the cyclic user program;
   overwriting an old recording of the assigned data and the first counter value associated with each executed command being monitored upon a renewed execution of the executed command so that all commands executed while monitoring the cyclic user program, and associated stored data, are identifiable at the same time in the recording buffer, wherein different first counter values are assigned when data in the buffer corresponds to commands executed during different cycles of the user program; and
   outputting content of the recording buffer by the automation device on request of the programming device and displaying the data to a user.

10. The method as claimed in claim 9, wherein stored values of different commands have different time values.

11. The method as claimed in claim 10, wherein for each command executed the recording buffer contains the command number, the counter value and the values of the associated data.

12. The method as claimed in claim 11, wherein the recording buffer has no data entry if a command is not executed.

13. The method as claimed in claim 11, wherein the counter value is incremented for each recording of values.

14. The method as claimed in claim 11, wherein the counter value is increased for each run of a program section.

15. The method as claimed in claim 11, wherein for commands to be monitored but which have not yet been executed, the command number and a further counter value are stored in the recording buffer, wherein storage space is reserved for the associated data, with the further counter value indicating that an associated command has not yet been executed.

\* \* \* \* \*